United States Patent
Chen et al.

(10) Patent No.: US 10,236,933 B2
(45) Date of Patent: Mar. 19, 2019

(54) TIMING OFFSET COMPENSATION FOR INTER-LINK INTERFERENCE CANCELLATION

(71) Applicant: QUALCOMM Incorporated, San Diego, CA (US)

(72) Inventors: Wanshi Chen, San Diego, CA (US); Wei Zeng, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/589,874

(22) Filed: May 8, 2017

(65) Prior Publication Data
US 2018/0102807 A1    Apr. 12, 2018

Related U.S. Application Data

(60) Provisional application No. 62/405,761, filed on Oct. 7, 2016.

(51) Int. Cl.
*H04B 1/7107*    (2011.01)
*H04L 25/03*    (2006.01)
(Continued)

(52) U.S. Cl.
CPC ..... *H04B 1/7107* (2013.01); *H04L 25/03006* (2013.01); *H04L 25/0328* (2013.01);
(Continued)

(58) Field of Classification Search
CPC combination set(s) only.
See application file for complete search history.

(56) References Cited

U.S. PATENT DOCUMENTS 8,526,420 B2 * 9/2013 Weng ............... H04J 3/0682
370/350
9,014,171 B2 * 4/2015 Weng ............... H04W 72/04
370/336

(Continued)

OTHER PUBLICATIONS

Huawei et al., "Discussion on TRP-to-TRP Interference Mitigation Schemes", 3GPP Draft; R1-1608830, 3rd Generation Partnership Project (3GPP), Mobile Competence Centre, 650, Route Des Lucioles, F-06921, Sophia-Antipolis Cedex, France, vol. RAN WG1, No. Lisbon, Oct. 1, 2016, XP051159157, Retrieved from the Internet: URL:http://www.3gpp.org/ftp/tsg_ran/WG1_RL1/TSGR1_86b/Docs/ [retrieved on Oct. 1, 2016], 4 pages.

(Continued)

*Primary Examiner* — Cindy Trandai
(74) *Attorney, Agent, or Firm* — Loza & Loza, LLP

(57) ABSTRACT

Aspects of the disclosure relate to inter-link interference cancellation for reducing or mitigating interference from signals in different directions (e.g., uplink and downlink directions). A wireless communication device (i.e., a victim device subject to inter-link interference) may determine a time offset or lead time of an interfering signal from an offending device. Based on the determined time offset, the victim device may perform interference cancellation or suppression to reduce or mitigate the interference of the interfering signal. Other aspects, embodiments, and features are also claimed and described.

18 Claims, 12 Drawing Sheets

(51) Int. Cl.
*H04L 27/26* (2006.01)
*H04W 56/00* (2009.01)

(52) U.S. Cl.
CPC .. *H04L 25/03273* (2013.01); *H04L 25/03821* (2013.01); *H04L 27/2657* (2013.01); *H04W 56/0045* (2013.01)

(56) References Cited

U.S. PATENT DOCUMENTS

| | | | | |
|---|---|---|---|---|
| 9,042,925 B2 * | 5/2015 | Seo | H04W 56/00 | 455/408 |
| 9,832,746 B2 * | 11/2017 | Zhang | H04W 56/0005 | |
| 2003/0087647 A1 * | 5/2003 | Hurst | H04W 64/00 | 455/456.1 |
| 2006/0166688 A1 * | 7/2006 | Sun | H04B 7/2681 | 455/502 |
| 2009/0180402 A1 * | 7/2009 | Lindoff | H04B 1/44 | 370/277 |
| 2010/0323723 A1 * | 12/2010 | Gerstenberger | G01S 5/0226 | 455/456.5 |
| 2011/0080896 A1 * | 4/2011 | Krishnamurthy | H04W 56/0045 | 370/336 |
| 2011/0171949 A1 * | 7/2011 | Liao | H04W 56/0045 | 455/422.1 |
| 2012/0015659 A1 * | 1/2012 | Kalyani | H04W 72/085 | 455/436 |
| 2012/0258706 A1 * | 10/2012 | Yu | H04W 56/002 | 455/426.1 |
| 2013/0010711 A1 * | 1/2013 | Larsson | H04W 56/0005 | 370/329 |
| 2013/0044831 A1 * | 2/2013 | Narasimha | H04W 52/346 | 375/260 |
| 2013/0190006 A1 * | 7/2013 | Kazmi | H04W 64/006 | 455/456.1 |
| 2014/0044108 A1 * | 2/2014 | Earnshaw | G01S 5/0063 | 370/336 |
| 2014/0056165 A1 * | 2/2014 | Siomina | H04B 1/7083 | 370/252 |
| 2014/0112194 A1 * | 4/2014 | Novlan | H04W 48/16 | 370/254 |
| 2014/0328329 A1 * | 11/2014 | Novlan | H04W 72/042 | 370/336 |
| 2015/0230268 A1 * | 8/2015 | Chen | H04L 5/14 | 370/280 |
| 2015/0296365 A1 * | 10/2015 | Choi | H04W 56/00 | 370/336 |
| 2015/0327198 A1 * | 11/2015 | Axmon | H04W 56/0045 | 370/336 |
| 2015/0333877 A1 | 11/2015 | Rahman et al. | | |
| 2015/0334669 A1 * | 11/2015 | Zhang | H04W 56/0045 | 370/336 |
| 2016/0021483 A1 * | 1/2016 | Wei | H04W 4/005 | 455/41.2 |
| 2016/0100425 A1 * | 4/2016 | Dinan | H04W 52/18 | 370/329 |
| 2016/0143035 A1 * | 5/2016 | Xue | H04L 5/001 | 370/329 |
| 2016/0150492 A1 * | 5/2016 | Wang | H04W 56/00 | 370/336 |
| 2016/0162783 A1 * | 6/2016 | Tan | H04W 24/02 | 706/13 |
| 2016/0366661 A1 * | 12/2016 | Yoshizawa | H04W 56/0045 | |
| 2017/0359790 A1 * | 12/2017 | Wang | H04W 28/04 | |

OTHER PUBLICATIONS

Huawei et al., "Discussion on UE-to-UE Interference Mitigation Schemes", 3GPP Draft; R1-1608831, 3rd Generation Partnership Project (3GPP), Mobile Competence Centre, 650, Route Des Lucioles, F-06921, Sophia-Antipolis Cedex, France, vol. RAN WG1, No. Lisbon, Portugal; Oct. 1, 2016, XP051159158, Retrieved from the Internet: URL:http://www.3gpp.org/ftp/tsg_ran/WG 1_RL1/TSGR1_86b/Docs/ [retrieved on Oct. 1, 2016], 3 pages.
International Search Report and Written Opinion—PCT/US2017/050518—ISA/EPO—Nov. 28, 2017.

* cited by examiner

TIMING OFFSET COMPENSATION FOR INTER-LINK INTERFERENCE CANCELLATION

PRIORITY CLAIM

This application claims priority to and the benefit of provisional patent application No. 62/405,761 filed in the United States Patent and Trademark Office on 7 Oct. 2016, the entire content of which is incorporated herein by reference as if fully set forth below in its entirety and for all applicable purposes.

TECHNICAL FIELD

The technology discussed below relates generally to wireless communication systems, and more particularly, to inter-link interference cancellation. Embodiments can provide and enable techniques for compensating for timing offsets between uplink and downlink signals to achieve effective inter-link interference cancellation.

INTRODUCTION

In any wireless communication system, the issue of signal interference is one of the more significant concerns for improving the reliability of a transmission. Many different interference mitigation, suppression, and cancellation techniques have been used in the art, applied in different systems that may have different characteristics and different needs. Here, interference may refer to inter-device interference, where a device cancels interference caused by a transmission from an external device. Further, interference may additionally or alternatively refer to self-interference, caused by a transmission from the same device. For example, notch filters, adaptive filters using least mean square (LMS) estimation and feed-forward cancellation (e.g., including LMS detection), and many other various techniques have been introduced to mitigate interference and are known to those having ordinary skill in the art.

In particular, substantial effort has been put forth developing transmission coordination to mitigate inter-user and inter-cell interference. Fourth generation (4G) networks such as the 3rd Generation Partnership Project (3GPP) Long-Term Evolution (LTE) networks include several interference mitigation schemes along these lines, including enhanced inter-cell interference coordination (eICIC) and network assisted interference cancellation/suppression (NA-ICs).

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to inter-link interference cancellation for reducing or mitigating interference from signals in different directions (e.g., uplink and downlink directions). A wireless communication device (i.e., a victim device subject to inter-link interference) may determine a time offset or lead time of an interfering signal from an offending device. Based on the determined time offset, the victim device may perform interference cancellation or suppression to reduce or mitigate the interference of the interfering signal. Other aspects, embodiments, and features are also claimed and described.

One aspect of the present disclosure provides a method for inter-link interference cancellation. A victim device receives a first signal of a first link direction. The first link direction may be uplink or downlink. The victim device identifies an interfering signal from an offending device. The interfering signal has a second link direction that is different from the first link direction. The victim device determines a time offset between a boundary of the first signal and a boundary of the interfering signal. Based on the determined time offset, the victim device performs interference cancellation or interference suppression to reduce or mitigate interference of the interfering signal upon the first signal.

Another aspect of the present disclosure provides a wireless communication device that includes a memory stored with executable code, a transceiver configured for wireless communication, and a processor operatively coupled to the memory and transceiver. The processor is configured by the executable code to receive a first signal of a first link direction. The first link direction may be uplink or downlink. The processor, as a victim device, identifies an interfering signal from an offending device. The interfering signal has a second link direction that is different from the first link direction. The victim device determines a time offset between a boundary of the first signal and a boundary of the interfering signal. Based on the determined time offset, the victim device performs interference cancellation or interference suppression to reduce or mitigate interference of the interfering signal upon the first signal.

Another aspect of the present disclosure provides a wireless communication device that includes various means for wireless communication and interference cancellation. The device includes means for receiving a first signal of a first link direction. The first link direction may be uplink or downlink. The device further includes means for identifying an interfering signal from an offending device. The interfering signal has a second link direction that is different from the first link direction. The device further includes means for determining a time offset between a boundary of the first signal and a boundary of the interfering signal. The device further includes means for based on the determined time offset, performing interference cancellation or interference suppression to reduce or mitigate interference of the interfering signal upon the first signal.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide various apparatuses, methods, and procedures that can facilitate inter-link interference cancellation. In particular, inter-link interference cancellation may be used to reduce or mitigate interference between signals in different directions (e.g., uplink and downlink directions). Inter-link interference may also be referred to as cross-link interference in this disclosure. In order to perform interference cancellation between links of different directions, timing alignment and/or positioning between the signals are needed. To that end, a victim device may determine a time offset, delay, or lead time of an interfering signal from an offending device. Based on the determined time offset, delay or lead time, the victim device may perform interference cancellation or suppression to reduce or mitigate the interference of the interfering signal.

Figure 1:
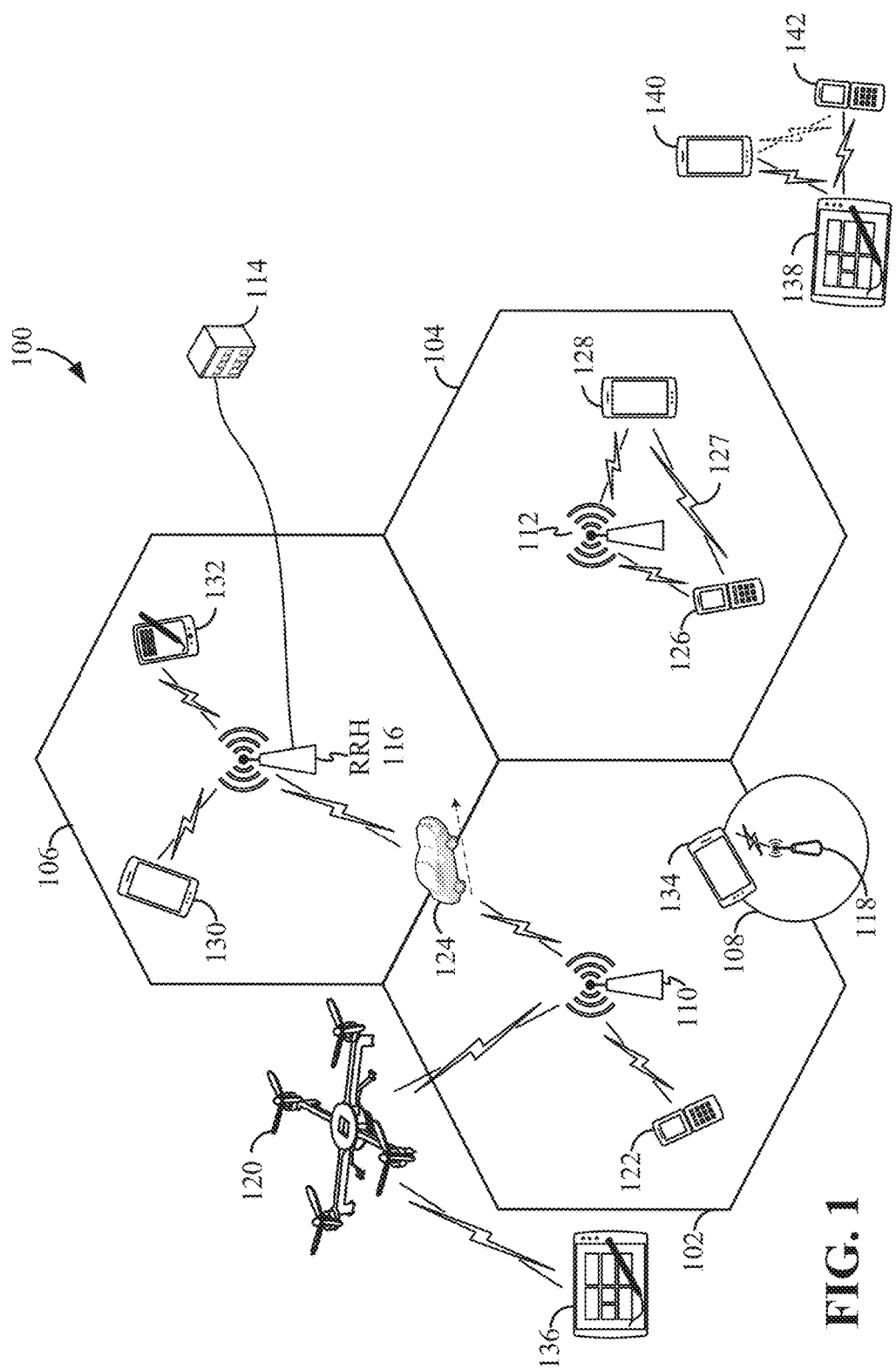
FIG. 1 is a conceptual diagram illustrating an example of an access network.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNB, or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UEs (e.g., UEs 126 and 128) may communicate with each other using peer to peer (P2P) or sidelink signals 127 without relaying that communication through a base station (e.g., base station 112).

Unicast or broadcast transmissions of control information and/or traffic information from a base station (e.g., base station 110) to one or more UEs (e.g., UEs 122 and 124) may be referred to as downlink (DL) transmission, while transmissions of control information and/or traffic information originating at a UE (e.g., UE 122) may be referred to as uplink (UL) transmissions. In addition, the uplink and/or downlink control information and/or traffic information may be time-divided into frames, subframes, slots, and/or symbols. As used herein, a symbol may refer to a unit of time that, in an orthogonal frequency division multiplexing (OFDM) waveform, carries one resource element (RE) per subcarrier. Of course, any suitable scheme for organizing waveforms may be utilized, and various time divisions of the waveform may have any suitable duration.

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (01-DMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FUM), orthogonal frequency division multiplexing (OFDM), sparse code multiplexing (SCM), or other suitable multiplexing schemes.

Further, the air interface in the radio access network 100 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the radio access network 100, the ability for a UE to communicate while moving, independent of its location, is referred to as mobility. The various physical channels between the UE and the radio access network are generally set up, maintained, and released under the control of a mobility management entity (MME) or the like (e.g., an Access and Mobility Management Function (AMF) and a Session Management Function (SMF)). In various aspects of the disclosure, a radio access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 (illustrated as a vehicle, although any suitable form of UE may be used) may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
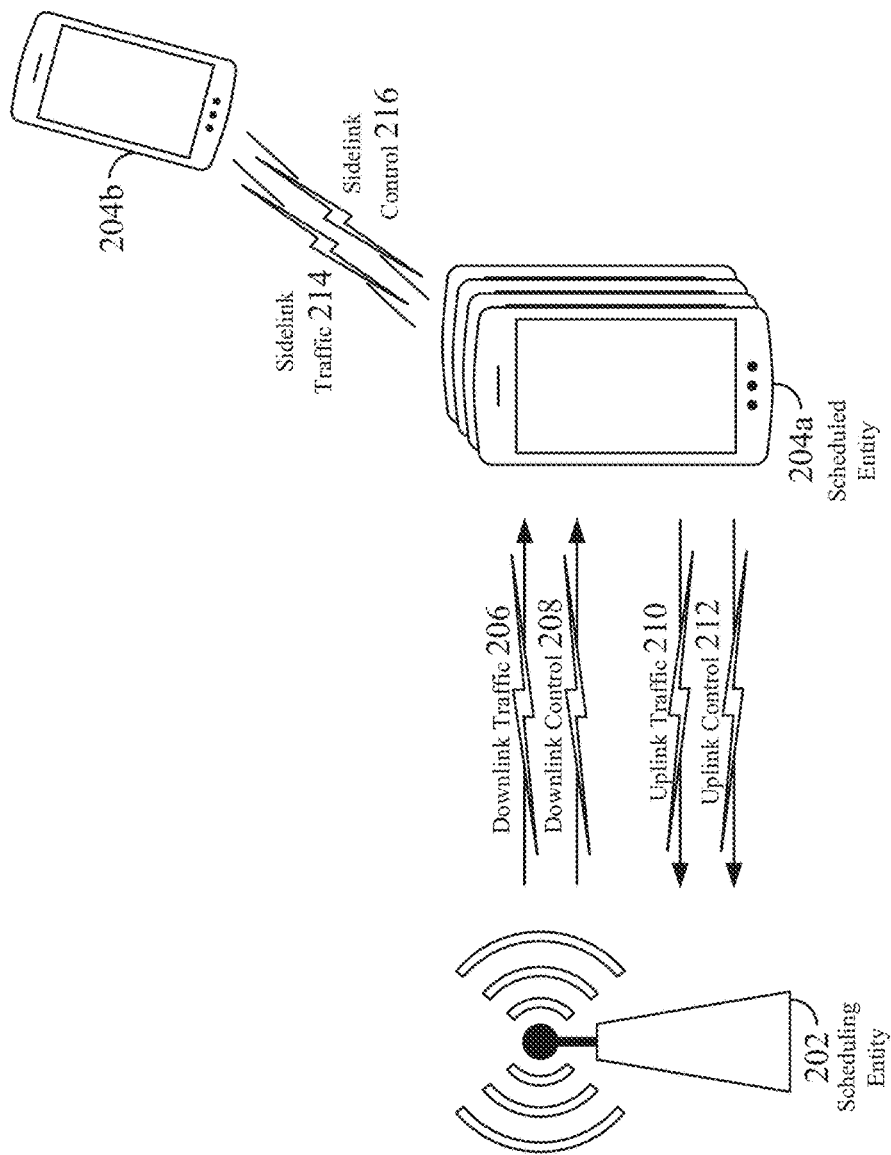
FIG. 2 is a block diagram conceptually illustrating an example of a scheduling entity communicating with one or more scheduled entities according to some aspects of the disclosure.

Thus, in a wireless communication network with scheduled access to time—frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the radio access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast traffic 206 to one or more scheduled entities 204 (the traffic may be referred to as downlink traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink traffic 210 and/or downlink traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and traffic information may be organized by subdividing a carrier, in time, into suitable transmission time intervals (TTIs).

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the TTI for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink traffic 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink traffic information 214.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other traffic, control, and feedback channels.

Figure 3:
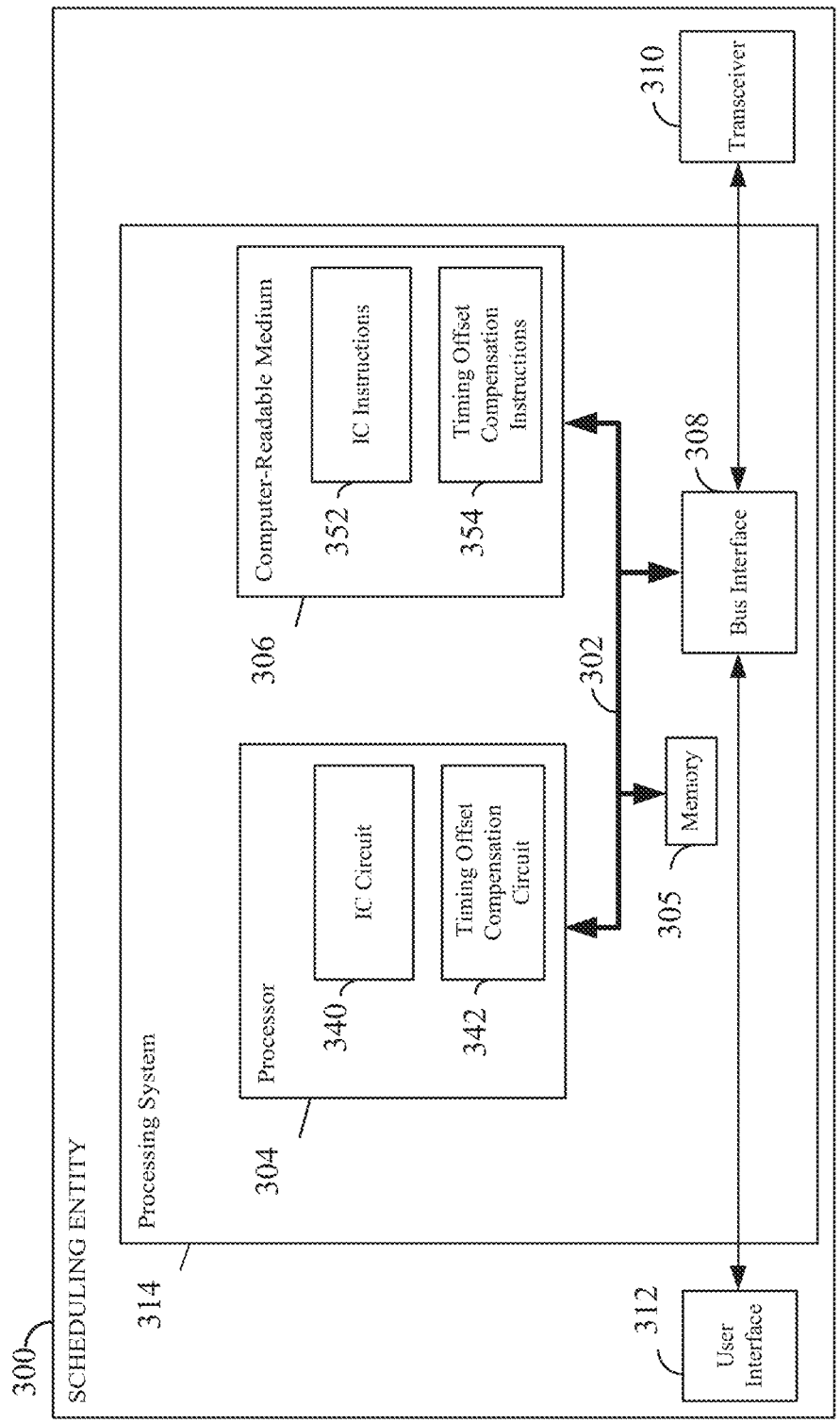
FIG. 3 is a block diagram illustrating an example of a hardware implementation for a scheduling entity employing a processing system according to some aspects of the disclosure.

FIG. 3 is a simplified block diagram illustrating an example of a hardware implementation for a scheduling entity 300 employing a processing system 314. For example, the scheduling entity 300 may be a user equipment (UE) as illustrated in any one or more of FIGS. 1, 2, 7, 8, and/or 10. In another example, the scheduling entity 300 may be a base station as illustrated in any one or more of FIGS. 1, 2, 7, 8, and/or 10.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes described below and illustrated, e.g., in FIGS. 7-12.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. In various examples, a receiver corresponding to the transceiver 310 may be configured as an interference suppression (IS) receiver, a maximum likelihood (ML) receiver, an interference cancellation (IC) receiver, or any other suitable receiver with IC functions. Depending upon the nature of the apparatus, a user interface 312 (e.g., keypad, display, speaker, microphone, joystick) may also be provided.

In some aspects of the disclosure, the processor 304 may further include an interference cancellation (IC) circuitry 340, which may function in coordination with IC instructions 352. Here, the IC circuitry 340 and/or IC instructions 352 may be configured to enable cancellation or suppression of interference at the transceiver 310. The interference may include inter-link interference, where DL signals from a neighbor base station or scheduling entity interferes with the transceiver 310 receiving UL signals from a UE or scheduled entity. The IC circuitry 340 and/or IC instructions 352 may utilize any suitable interference cancellation algorithm or technique, including but not limited to antenna/RF isolation, transmit signal reconstruction and cancellation (e.g., using a digital baseband signal and/or transceiver output signal, channel response estimation, transceiver non-linearity modeling etc.), power amplifier noise cancellation, etc. The IC circuitry 340 and/or IC instructions 352 may include any suitable filter or equalizer configured for interference cancellation.

In some aspects of the disclosure, the processor 304 may include timing offset compensation (TOC) circuitry 342, which may function in coordination with timing offset compensation (TOC) instructions 354, configured for various functions, including, for example, calculating a signal propagation delay between an offending base station and a victim base station. The timing offset compensation circuitry 342 and/or TOC instructions 354 may also be configured to calculate, approximate and/or determine lead time and/or timing advance of an interfering signal as described in relation to FIGS. 7-12.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 4:
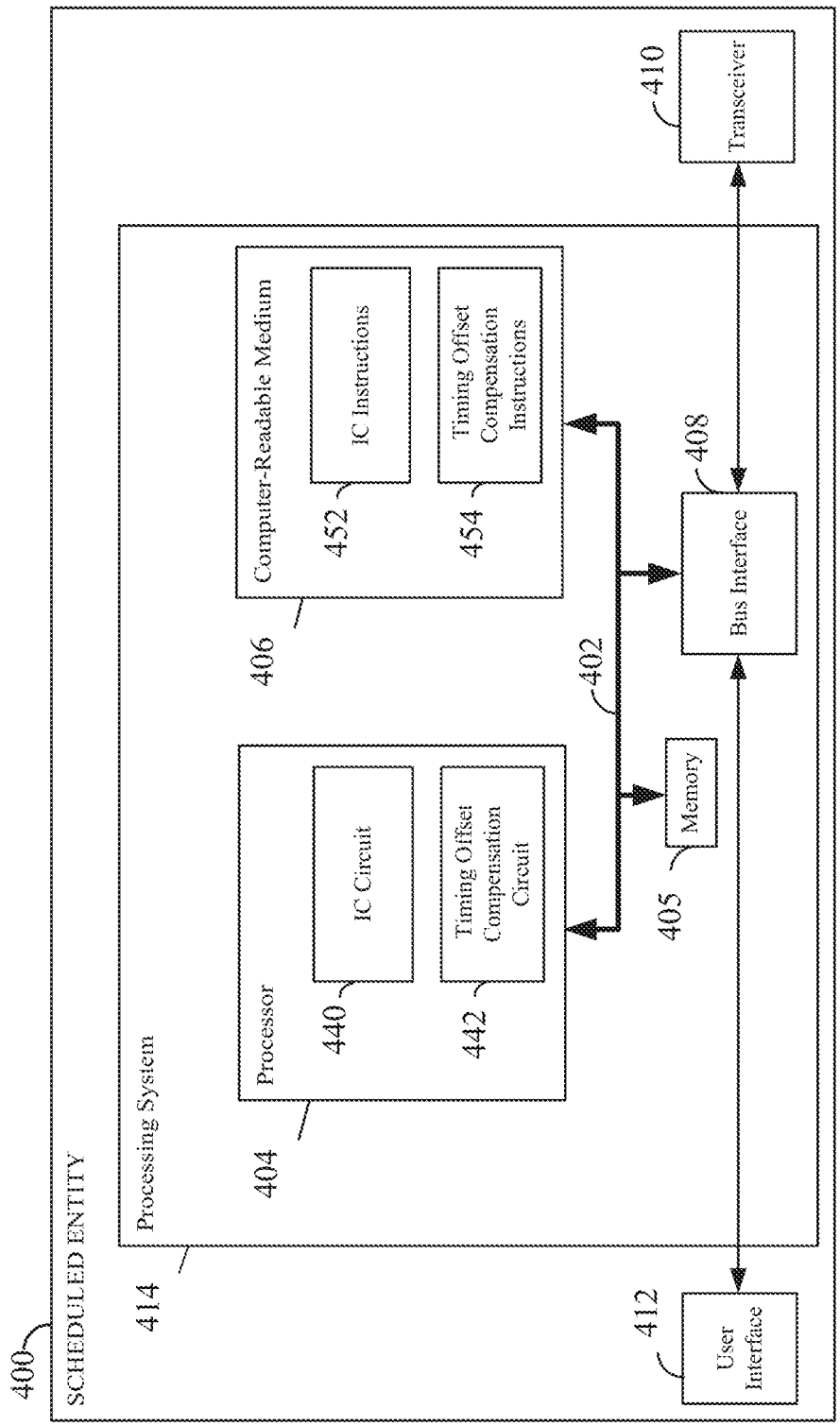
FIG. 4 is a block diagram illustrating an example of a hardware implementation for a scheduled entity employing a processing system according to some aspects of the disclosure.

FIG. 4 is a conceptual diagram illustrating an example of a hardware implementation for an exemplary scheduled entity 400 employing a processing system 414. In accordance with various aspects of the disclosure, an element, or any portion of an element, or any combination of elements may be implemented with a processing system 414 that includes one or more processors 404. For example, the scheduled entity 400 may be a user equipment (UE) as illustrated in any one or more of FIGS. 1, 2, 7, 8, and/or 10.

The processing system 414 may be substantially the same as the processing system 314 illustrated in FIG. 3, including a bus interface 408, a bus 402, memory 405, a processor 404, and a computer-readable medium 406. Furthermore, the scheduled entity 400 may include a user interface 412 and a transceiver 410 substantially similar to those described above in FIG. 3. The transceiver 410 may be utilized for transmitting and/or receiving uplink (UL), downlink (DL), and/or sidelink signals. Thus, the processor 404, as utilized in a scheduled entity 400, may be used to implement any one or more of the processes described below and illustrated, e.g., in FIGS. 7-12.

In some aspects of the disclosure, the processor 404 may further include an interference cancellation (IC) circuitry 440, which may function in coordination with IC instructions 452. Here, the IC circuitry 440 and/or instructions 452 may be configured to enable cancellation or mitigation of interference at the transceiver 410. The interference may include inter-link interference, where UL signals from an offending UE or scheduled entity interferes with the transceiver 410 receiving DL signals from a base station or scheduling entity. The IC circuitry 440 and/or IC instructions 452 may utilize any suitable interference cancellation algorithm or technique, including but not limited to antenna/ RF isolation, transmit signal reconstruction and cancellation (e.g., using a digital baseband signal and/or transceiver output signal, channel response estimation, transceiver non-linearity modeling etc.), power amplifier noise cancellation, etc. The IC circuitry 440 and/or IC instructions 452 may include any suitable filter or equalizer configured for interference cancellation.

Figure 7:
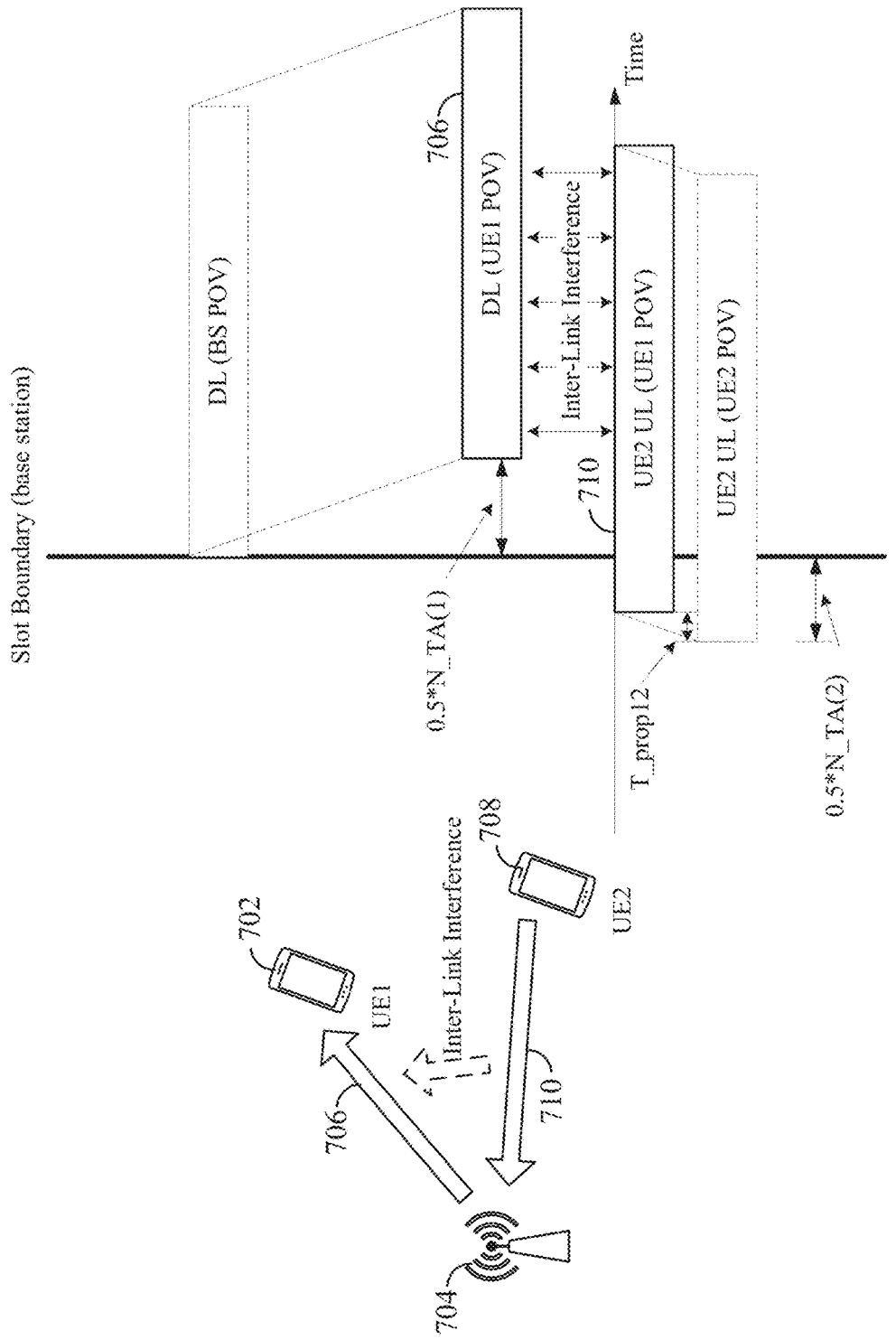
FIG. 7 is a schematic illustration of the timing of a downlink signal reception by a victim user equipment (UE), subject to inter-link interference from an offending uplink signal by a different UE.
Figure 8:
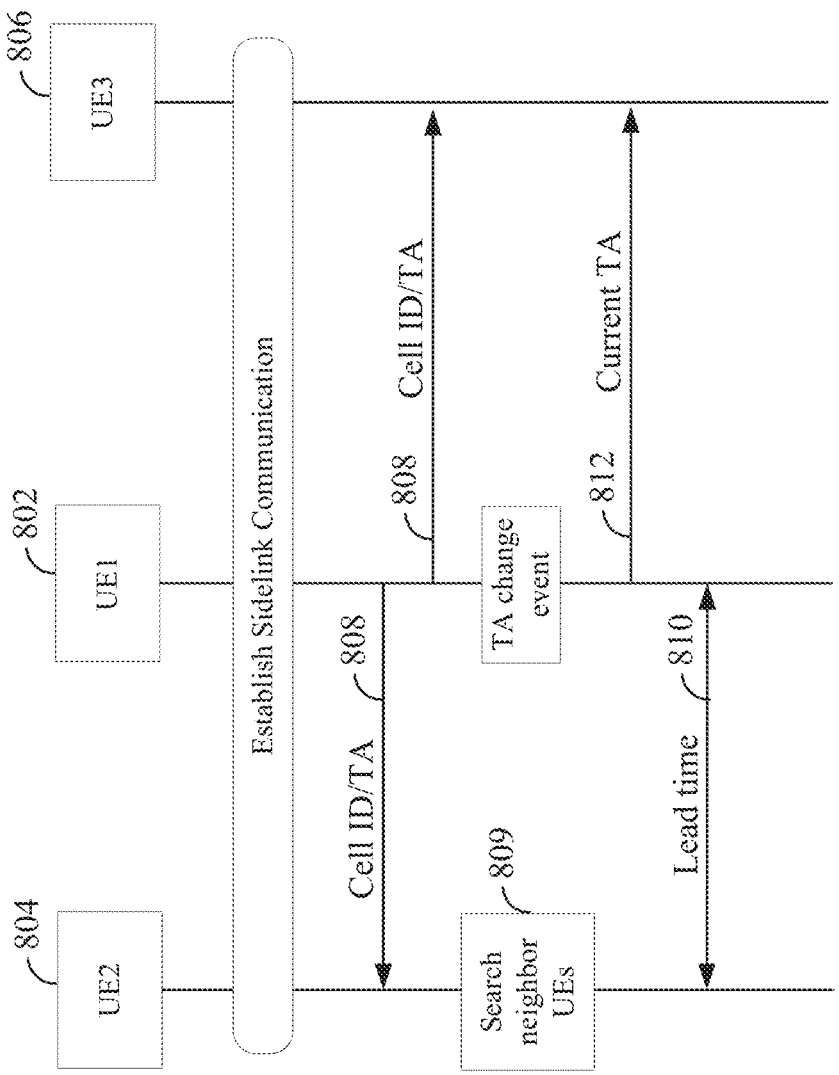
FIG. 8 is a diagram illustrating a process for a victim device to obtain cell and/or timing information from an offending device via sidelink signals according to some aspects of the disclosure.
Figure 9:
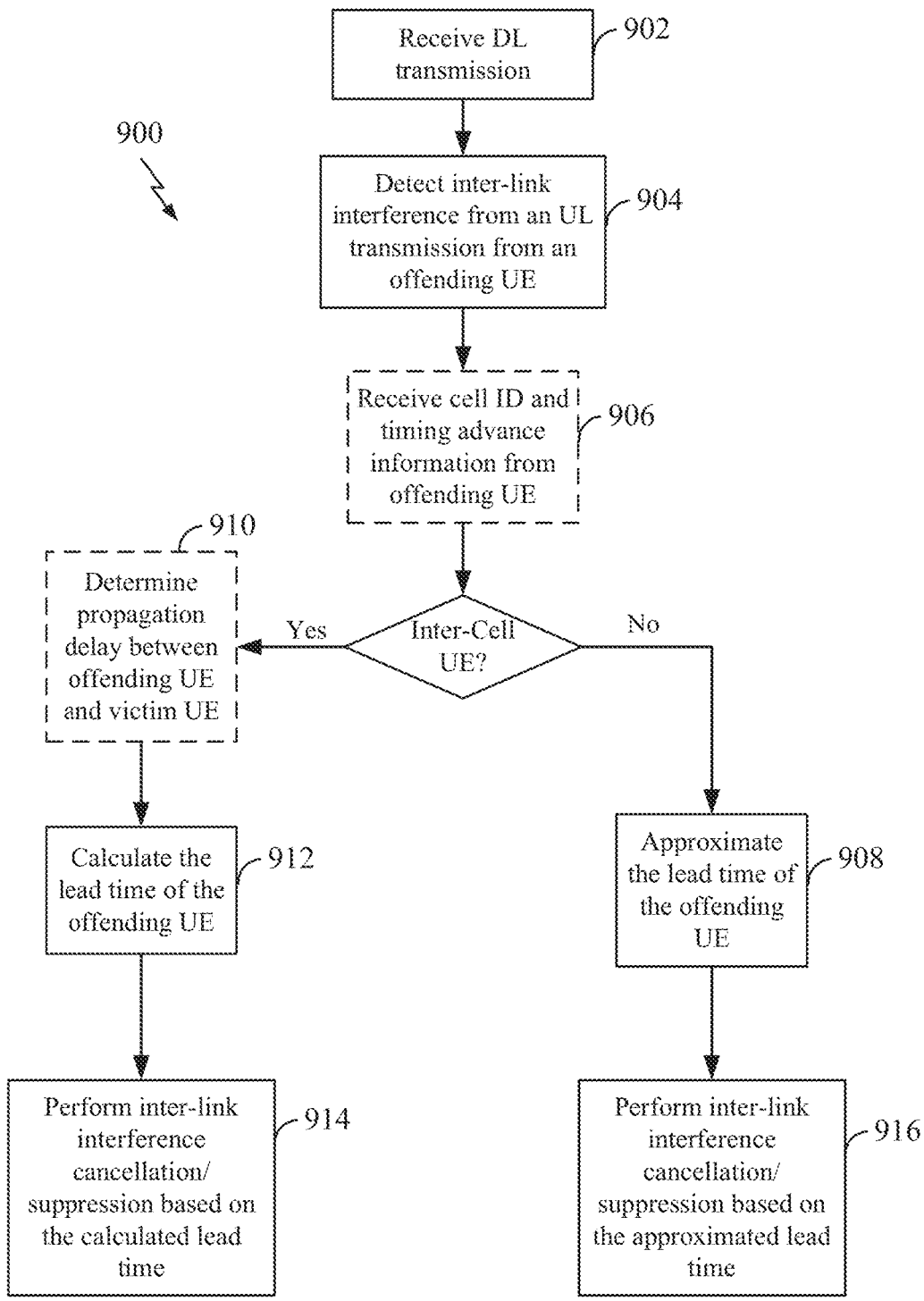
FIG. 9 is a flow chart illustrating a process for inter-link interference cancellation at a victim UE according to some aspects of the present disclosure.

In some aspects of the disclosure, the processor 404 may include timing offset determination and compensation (TOC) circuitry 442, which may function in coordination with timing offset compensation (TOC) instructions 454, configured for various functions, including, for example, calculating or approximating a lead time or timing advance of an offending UE as illustrated in FIGS. 7-9.

In any wireless communication system, the issue of signal interference is one of the more significant concerns for improving the reliability of a transmission. Many different interference mitigation and cancellation techniques have been used in the art, applied in different systems that may have different characteristics and different needs. Here, interference may refer to inter-device interference, where a device may utilize interference cancellation techniques to cancel or mitigate interference caused by a transmission from an external or different device. Further, interference may additionally or alternatively refer to self-interference, caused by a transmission from the same device. For example, interference may be mitigated by notch filters, adaptive filters using least mean square (LMS) estimation and feed-forward cancellation (e.g., including LMS detection), and many other various techniques have been introduced and are known to those having ordinary skill in the art.

In particular, substantial effort has been put forth developing transmission coordination to mitigate inter-user and inter-cell interference. Transmission coordination may refer to the timing of transmission and the coordination between the timings of different transmissions.

In 4G LTE networks, certain interference measurement and interference cancellation schemes are supported. For example, release 10 (Rel-10) of the 3GPP standards defining LTE-Advanced networks introduced enhanced inter-cell interference coordination (eICIC). eICIC particularly addresses interference between large cells and small cells in heterogeneous networks. In eICIC, broadly, the large cell may implement blanking of certain subframes so that it does not interfere with communication of nearby small cells.

Rel-12 of the 3GPP standards introduced network assisted interference cancellation/suppression (NAICs). NAICs generally focuses on data channel interference cancellation. NAICs achieves interference mitigation by enabling the network to provide certain information about interfering transmissions to the UE, so that the UE can better perform interference cancellation.

In general, LTE implementations of IC schemes assume subframe/slot alignment. Furthermore, the IC schemes in LTE or similar legacy networks are limited to cancellation of interference in the same direction: namely, UL-to-UL interference and DL-to-DL interference.

Figure 5:
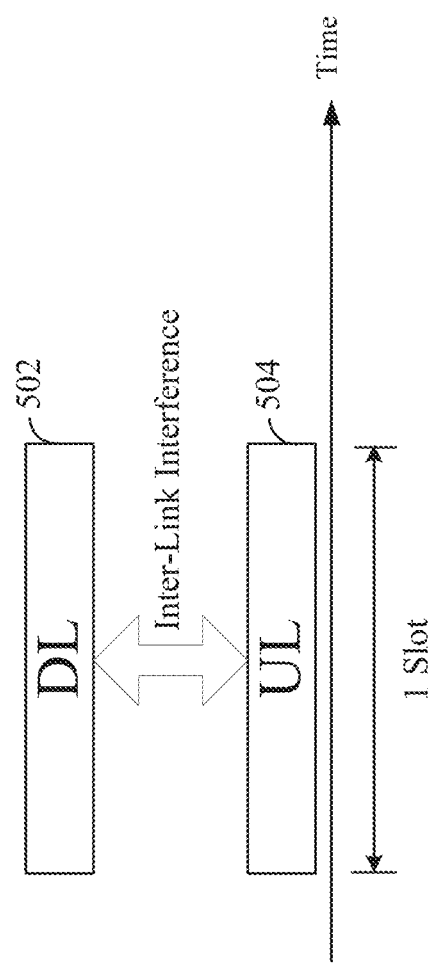
FIG. 5 is a schematic illustration showing a downlink transmission overlapping with an uplink transmission, resulting in inter-link interference.

However, existing LTE standards provide no explicit support of IC for different links (i.e., inter-link interference cancellation). Here, inter-link interference cancellation refers to cancellation, mitigation, or suppression of interference between UL and DL transmissions. FIG. 5 is a schematic illustration showing a DL transmission 502 overlapping with an UL transmission 504. As illustrated, the DL and UL transmissions may be at the same frequency or at different frequencies. In either case, inter-link interference can mean that the UL transmission 504 can increase an error rate of a device receiving the DL transmission 502, and the DL transmission 502 can increase an error rate of a device receiving the UL transmission 504. For example, a victim base station or scheduling entity 300, receiving the UL transmission 504 from a UE or scheduled entity 400, may be subject to an interfering DL transmission 502 from an oppressor, interferer, aggressor, or neighbor base station or scheduling entity. Similarly, a victim UE or scheduled entity 400, receiving the DL transmission 502 from its serving base station, may be subject to an interfering UL transmission 504 from an oppressor (offending) UE or scheduled entity.

This inter-link interference may arise in a variety of scenarios. For example, different DL/UL slot timing or configurations may be used in different cells in a network utilizing TDD. For example, different cells may operate with different link directions at any given time. In one example, cell A may be transmitting a DL at the same time as cell B may be receiving an UL. In this case, a UE served by cell A, which is receiving the DL from cell A, may experience interference from another UE served by cell B, which is transmitting an UL to cell B. Further, in a TDD network, dynamic slot or subframe configuration adaptation, which is a feature supported in LTE since Rel-12, can result in inter-link interference when a slot configuration is changed.

As wireless technology continues to develop, 3GPP standards are moving beyond 4G LTE, and standards for 5G New Radio (NR) networks are in development and being standardized.

NR as it is currently envisioned supports multiple types of service, such as enhanced mobile broadband (eMBB), ultra-reliable low-latency communication (URLLC), massive machine type communication (mMTC), etc. NR is expected to have more flexibility, and more dynamic slot direction management, dynamic slot length, etc., relative to LTE and legacy networks. For example, the structure of a slot may be dynamically managed or altered on the fly, for example, to make way for mission-critical URLLC packets. In addition, devices may dynamically alter or update the slot length. For example, mini-slots, half-slots, or other small scheduling units may be utilized on top of or in addition to regular slots. These short or thin slots may, for example, provide for mission-critical URLLC packets or high priority packets, where a UE may monitor for these packets and override previous grants of resources at a long or default slot to provide for transmission of the high priority packets in a short or thin slot.

Accordingly, in a given NR slot, it may be unpredictable whether there will be DL control, DL data, UL control, and/or UL data information. In some examples, a slot may include any two or more of these different types and directions of information. As a result, over time it is more likely to have inter-link interference from other cells.

Another feature expected in NR networks is the use of symmetric waveforms. In LTE networks, UL signals use a single-carrier waveform (i.e., a DFT-spread OFDM, also referred to as SC-FDMA), and DL signals use OFDM. However, in 5G NR networks, both DL and UL signals may employ OFDM-based waveforms. Further, UL and DL waveforms may even utilize similar demodulation reference signal (DM-RS) designs. This use of symmetric waveforms on the UL and the DL can facilitate improved interference cancellation of different link directions.

In the case of DL-to-DL interference, from the UE's perspective, the timing of slots on the two DL carriers from the same base station may be essentially aligned. In a 5G NR network, the timing for different base stations may be synchronized such that slot boundaries are time-aligned across different cells. Accordingly, the interfering signal from another base station may be approximately aligned, other than the existence of an offset or delay due to different propagation delays from base stations at different distances from the UE. However, if a base station is close enough to cause problematic interference, then it is probably not so far away that its propagation delay would be significantly different from the UE's serving base station. In this case, use of a cyclic prefix (CP) can largely address the offset or delay. A cyclic prefix refers to the prefixing of a symbol with a repetition of the end. Upon receiving this packet, the receiving device may discard the CP.

However, in order to cancel interference from links of different directions (inter-link interference), an IC process may have to handle potentially large timing differences between slots in the respective links. For suitable IC performance, good timing alignment/positioning between links with different directions may be necessary. In other words, a victim UE or base station may use or consider the starting timing of other link directions to improve inter-link IC performance. For example, to perform IC for DL reception due to an offending UE's UL transmissions, a victim UE may request the offending UE to adjust for the lead time of the offending UE's transmissions in its IC operations. Similarly, to perform IC for UL reception due to an offending base station's DL transmissions, a victim base station may request the offending base station to compensate for the propagation delays in between the two base stations in its IC operations.

Figure 6:
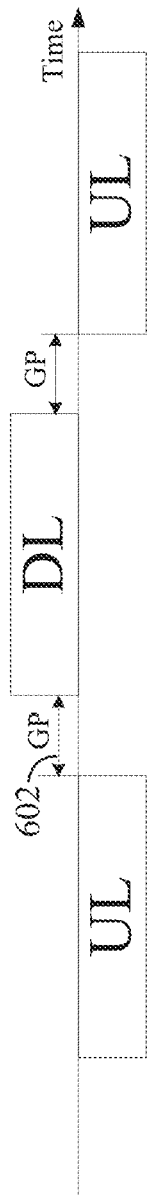
FIG. 6 is an illustration of a timing offset between uplink and downlink slot boundaries from the perspective of a base station.

According to an aspect of the disclosure, a wireless communication network may be a synchronous system wherein, from the perspective of a base station, DL transmissions from the base station may substantially be aligned at slot boundaries across different base stations. Additionally, from the base station's perspective, DL and UL transmissions may also be substantially aligned at slot boundaries, potentially subject to an offset. FIG. 6 is an illustration of this timing offset 602 between UL and DL slot boundaries from the point of view (POV) of a base station. This offset 602 can provide a guard period (GP) or gap, providing time for the base station to perform Rx to Tx switching.

Different UEs at different distances from a base station may have different propagation delays for their UL transmissions to the base station. This can cause the slot boundaries to be misaligned from the base station's POV for UL transmissions from different UEs. In some examples, the base station may be responsible for ensuring that the slot boundaries of all UL transmissions received at the base station are substantially aligned in time.

As one example to illustrate certain concepts, LTE networks utilize a timing advance or timing alignment (TA) procedure known to those having ordinary skill in the art. The LTE TA procedure compensates for these over-the-air radio transmission round trip time delays and provides time synchronization of all UL signals received at the base station. In the LTE TA procedure, a UE may start transmission of a random access preamble transmission assuming no timing advance (i.e., N_TA=0). In response, the base station transmits a random access response message that provides the actual timing advance N_TA. The UE then adjusts its UL transmission timing according to the value of N_TA, by offsetting slot boundaries relative to its current UL timing.

In an aspect of the present disclosure, the base station may transmit UL timing advance (TA) commands to UEs to drive this alignment. In addition to the TA, a UE may additionally apply a GP offset to provide a guard period or gap, providing time for the base station to perform Rx to Tx switching. For example, from the base station's perspective, UL slot boundaries may lead DL slot boundaries by a predetermined duration (e.g., 20 μs). Thus, for transmission of an UL signal, a UE applies a time offset according to the parameters (N_TA, GP_offset).

FIG. 7 is a schematic diagram illustrating DL reception by a victim UE (UE1), subject to inter-link interference from an offending UL transmission by a second UE (UE2). In FIG. 7, the horizontal dimension represents time. The vertical dimension has no units, and is only utilized to show the different transmissions at different times. In various examples, the DL and UL transmissions may have the same frequency or may be at different frequencies.

For discussion of FIG. 7, assume that UE1 702 is a UE of interest for the purpose of interference cancellation. Here, based, e.g., on round trip time (RTT) measurements and TA signaling between UE1 and its serving base station 704, it may be assumed that UE1 has been assigned a timing advance of N_TA(1). According to an aspect of the present disclosure, N_TA(1) is approximately equal to two times the one-way propagation delay for wireless transmissions between UE1 702 and its serving base station 704. From UE1's perspective (see FIG. 7), its DL reception time is about 0.5*N_TA(1) later than the base station's transmission time.

Note that the UE1 may also apply its timing advance N_TA(1) to its own UL transmissions (not illustrated), so that a slot boundary at the beginning of the UL transmission may be in advance of the slot boundary from the base station's perspective. In this way, the UL transmission from UE1 may arrive with its slot boundaries aligned with the base station timing.

While the UE of interest (UE1) is receiving the DL transmission 706 from its serving base station 704, it may be subject to inter-link interference. That is, another UE (UE2) 708 may be considered an interfering or offending UE (e.g., aggressor UE). The offending UE 708 (UE2) may transmit an UL signal 710 that could interfere with UE1's reception of the DL transmission 706 from its serving base station 704. In this case, the UL signal 710 is an interfering signal from the point of view of UE1. This offending UE's timing advance N_TA(2) may differ from the timing advance N_TA(1) at UE1. For example, UE2 708 may be located at a different distance from the base station 704 than UE1 702, such that the propagation delay for UL transmissions from UE2 to the base station is different from the propagation delay for UL transmissions from UE1 to the base station. Thus, the slot boundary at the beginning of the interfering or offending UE (UE2)'s UL transmission is about 0.5*N_TA (2) ahead of the base station's slot boundary. Additionally, as discussed further below, an offending UE may have a different timing advance in cases where the offending UE has a different serving cell from UE1, and in particular, in heterogeneous networks.

Furthermore, the UL transmission 710 from the offending UE 708 (UE2) may be subject to a propagation delay before its arrival at the victim UE 702 (UE1). As illustrated in FIG. 7, the propagation delay between UE1 and UE2 may be notated as T_prop12.

These parameters N_TA(1), N_TA(2), and T_prop12 may be utilized to determine the lead time of UL interference, due to UE2, to DL transmissions to UE1. Specifically:

$$\text{Lead Time} = 0.5*(N\_TA(1) + N\_TA(2)) - T\_\text{prop}12$$

The above equation may be subject to simplification based on certain assumptions. For example, in many cases, an offending UE may not cause substantial inter-link interference unless the offending UE is closely located to the victim UE. If the offending UE were far from the victim UE, the propagation delay T_prop12 would be large, but the amount of interference may be negligible and inter-link interference cancellation may not be necessary. However, if the offending UE were close to the victim UE, the propagation delay T_prop12 would be very small (e.g., negligible), although the amount of interference may be large. This is the instance where inter-link interference cancellation would be most useful. Accordingly, in the above equation, in some aspects of the disclosure, the inter-device propagation delay T_prop12 may be ignored or omitted (i.e., approximated as zero). In this case, the lead time of UL interference due to UE2, to DL transmissions to UE1, may be approximated as:

Lead Time≈0.5*(N_TA(1)+N_TA(2))

In order to determine the lead time 0.5*(N_TA(1)+N_TA(2)) (and potentially+N_TA, offset), the victim UE, UE1 already knows its own TA (N_TA(1)), but it does not know N_TA(2). Thus, the victim UE may either obtain that value or generate an estimate.

As indicated above, the offending UE is only likely to cause substantial interference to the victim UE in the instance that the offending UE is in relatively close proximity to the victim UE. Accordingly, it may be noted that if the victim UE, UE1 and the offending UE, UE2 have the same serving base station (intra-cell interference, e.g., due to FDM UL and DL in the same slot), one can assume that the timing advance of the offending UE may be approximately equal to the timing advance of the victim UE. That is, if UE1 and UE2 share a serving cell, then:

N_TA(1)≈N_TA(2)

Therefore, simplifying the above expression for the lead time, if the victim UE and the offending UE share a serving base station, the calculated lead time for the victim UE to apply for interference cancellation is roughly:

Lead Time≈N_TA(1)

Similarly, if the network is a homogeneous network, the same timing advance may be assumed for both the victim UE and the offending UE even if they have different serving cells. That is, if two UEs having different serving cells are close enough to one another to cause each other substantial interference, they may both be relatively near their respective cell edges. If both cells are the same size, then, their respective timing advances may be approximately the same. Thus, in some examples (e.g., in a homogeneous network), even victim UEs having different serving cells from their offending UEs may approximate that the offending UEs have the same timing advance as the victim UEs.

In particular, however, when operating within a heterogeneous network (where cells may have vastly different service areas and/or access methods from one another), if two UEs have different serving base stations, it is much more likely that those UEs have a different timing advance. In other words, N_TA(1) may be more likely to be different from N_TA(2). For example, a victim UE, UE1 may be served by a small cell (e.g., small cell 108 of FIG. 1) while an offending UE, UE2 may be served by a macro cell (e.g., macrocell 102 of FIG. 1). Even though these two UEs may be in close proximity to one another, their respective serving base stations may be at different distances so their respective timing advances may be substantially different.

In some examples, if there are two or more offending UEs that share the same serving cell as the victim UE, their UL TA may be expected to be close to one another since both offending UEs are causing interference to the victim UE. In some examples, a victim UE may only consider the UL TA of the offending UE that causes the dominant interference.

Thus, according to an aspect of the disclosure, the algorithm a victim UE uses to calculate the lead time of an offending UE may depend on whether the victim UE shares a serving base station with the offending UE. Here, determination on whether the victim UE shares a serving base station with the offending UE may be made by determining a cell identification (ID) (e.g., a physical cell ID or PCI) of the serving cell of the offending UE.

In cases where the victim UE cannot or does not assume or approximate the value of the timing advance of an offending UE, the value of the timing advance (or some related information) may be signaled to the victim UE. In one example, a base station may signal information relating to a lead time of an offending UE to a victim UE. In this example, identification of the offending UE may not be straightforward, as the victim UE may not know the identity of the offending UE or UEs. Furthermore, in some networks, a base station may not generally be aware of a UE's UL TA values. For example, as described above in relation to an existing LTE network, an eNB transmits UL TA commands to a UE, and the UE accumulates those TA commands. In this way, the UL reception of all UEs can be aligned when received by the eNB.

Accordingly, the signaling overhead for identifying the offending UE, requesting the TA value of the offending UE from the base station, for the base station to obtain the TA value of the offending UE, and for this value to then be signaled back from the base station to the victim UE, may be quite substantial.

Therefore, in accordance with an aspect of the present disclosure, a victim UE may obtain information relating to the lead time of an offending UE via P2P, D2D, or sidelink signals. As described above, UEs can communicate with one another directly via such D2D or sidelink signals to share information such that the victim UE can determine the lead time of the offending UE.

FIG. 8 is a diagram illustrating a process for a victim UE to obtain information from an offending UE via sidelink signals according to some aspects of the disclosure. For example, a UE1 802 may signal its serving cell ID and/or its current TA to one or more neighboring UEs (e.g., UE2 804 and UE3 806) through a sidelink channel or P2P or D2D connection 808. This sidelink signaling can be broadcast or unicast signaling. In a broadcast signal, the TA and/or cell ID information may be picked up by any one or more proximate UEs. In one aspect, unicast or other dedicated D2D or sidelink signaling may provide for direct signaling of the information to a targeted device, once it is determined that it is relatively proximate or close-by, and/or that interference may be likely.

In some examples, a UE can search 809 for its neighboring UEs within close proximity. If a UE is close enough that sidelink communication is available, then that UE may be more likely to cause interference to the victim UE. For example, if the signal strength of a signal received from a neighboring UE is greater than a predetermined threshold, it may be determined that such UE is within close proximity Thus, if UEs can exchange sidelink signals, they may exchange information relating to their respective lead times 810 or TAs using sidelink signals.

The cell ID can be useful to distinguish intra-cell vs. inter-cell UEs. For example, if an offending UE is an intra-cell UE, then there may be no need to perform inter-link interference cancellation for this UE in the same set of resources. That is, among the time—frequency resources managed by a given scheduling entity or base station, it may be uncommon (or it may never occur) that an UL transmission would overlap with a DL transmission in the same resource. However, even without any overlap, there may be some leakage of a transmission in one direction onto communication in the other direction. Therefore, even for intra-cell UEs, a victim UE may still perform interference cancellation due to FDM operation.

However, functionality for inter-cell UEs may differ, because, as described above, there may be an overlap from one cell to another between transmissions in different directions. Accordingly, particularly for inter-cell offending UEs, victim UEs may implement interference cancellation as described herein.

In various examples, a UE may periodically or aperiodically broadcast or transmit its serving cell ID and/or information relating to its current TA, via sidelink signals. In an aperiodic example, transmission of a UE's cell ID and/or information relating to its current TA may be event-driven. For example, after establishing sidelink communications with another UE, the UE may indicate its serving cell ID and current TA. Subsequently, when a change to a TA value greater than a suitable threshold occurs, the UE may transmit the information relating to its current TA 812.

Note that, for a given UE, its serving cell ID may not dynamically (or rapidly) change. If the serving cell ID does change, it may be likely that the UE changed its location, possibly to a location distant from the victim UE and no longer problematic in terms of interference. On the other hand, the current TA value for a given UE may dynamically change. Thus, in some examples, a UE may signal its current TA value separately from its current cell ID. For example, the current TA value may be signaled more frequently than the cell ID value. In another example, the cell ID may be signaled only upon request by a victim or neighbor UE.

FIG. 9 is a flow chart illustrating a process 900 for inter-link interference cancellation at a victim UE according to some aspects of the present disclosure. As described below, some or all illustrated features may be omitted in a particular implementation within the scope of the present disclosure, and some illustrated features may not be required for implementation of all embodiments. In some examples, the process 900 may be carried out by the scheduled entity 400 illustrated in FIG. 4. In some examples, the process 900 may be carried out by any suitable apparatus or means for carrying out the functions or algorithm described below.

As illustrated, at block 902, a UE of interest (victim UE) receives a DL transmission. At block 904, when the victim UE is receiving the DL transmission, the UE may become aware of inter-link interference from an offending UE that transmits an UL transmission. As an example, the victim UE may determine that there is an offending UE causing inter-link interference by detecting a reference signal transmitted by the offending UE.

To facilitate inter-link interference cancellation, at block 906, the victim UE may obtain the cell ID and information relating to the TA from the offending UE, for example, using sidelink signals as described above in relation to FIG. 8. Here, if the offending UE is not an inter-cell UE (i.e., the victim UE and the offending UE share a serving cell), then at block 908 the victim UE may approximate the lead time of the offending UE by assuming that the TA value for the offending UE is equal to the TA value for the victim UE. At block 916, if the offending UE is not an inter-cell UE, the victim UE may perform inter-link interference cancellation or suppression based on the approximated lead time. As an example, the victim UE may estimate and re-construct the interference from the offending UE taking into account the approximated lead time, and then performing interference cancellation or suppression accordingly.

On the other hand, if the offending UE is an inter-cell UE (i.e., the victim UE and the offending UE have different serving cells), then at block 910 the victim UE may optionally determine a propagation delay between the victim UE and the offending UE, e.g., by measuring a round trip time (RTT) between the respective UEs. As an example, this can be measured by using a reference signal transmitted by the victim UE or the offending UE. Because the propagation delay may be small, as discussed above, this step may be omitted in some examples.

At block 912, the victim UE may then calculate the lead time of the offending UE. As discussed above, the lead time may be $0.5*N\_TA(1)+0.5*N\_TA(2)$. At block 914, if the offending UE is an inter-cell UE, the victim UE may perform inter-link interference cancellation or suppression based on the calculated lead time.

In a further aspect of the present disclosure, a base station may enable or disable an inter-link interference cancellation feature at a UE of interest. For example, a base station may transmit broadcast signaling or dedicated signaling to a UE including an instruction to enable or disable the inter-link interference cancellation feature. In a particular implementation, the inter-link interference cancellation feature may be enabled only by base stations within heterogeneous networks. In some examples, the base station may transmit an RRC message or a semi-static message that includes the instruction to enable or disable the inter-link interference cancellation feature. In some examples, the base station may transmit the instruction in a DL control portion (e.g., PDCCH) of a slot.

In a further aspect of the disclosure, a victim UE may utilize a default lead time or TA for an offending UE. This default lead time may be used in a case where a victim UE does not receive information relating to the TA of an offending UE. In some examples, the default lead time may be based on the UL TA of the victim UE. For example, if a UE does not receive information relating to the TA of an offending UE, then the victim UE may assume that the offending UE has the same TA as the victim UE. That is, $N\_TA(1)=N\_TA(2)$.

In some examples, the inter-link interference cancellation feature described above (and, e.g., illustrated in FIG. 9) may be performed for all slots, or for a subset of slots. For example, some implementations may occur where only a subset of slots has any probability of having different link directions (UL and DL) that overlap. Accordingly, in an aspect of the present disclosure, a base station may indicate to a given UE a subset of slots when different link directions may occur. In this case, the UE can perform the interference cancellation feature described above based on this timing; and in other slots, the UE may disable the inter-link interference cancellation.

Figure 10:
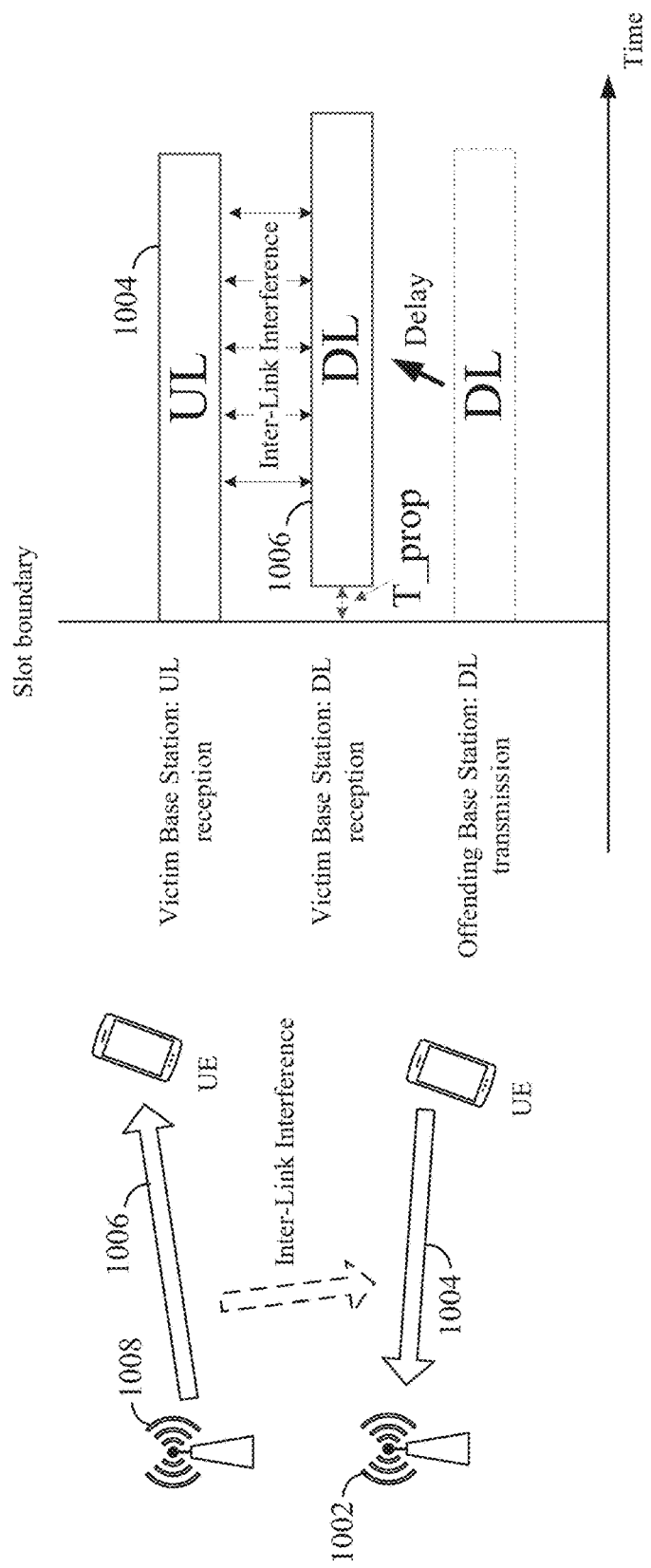
FIG. 10 is a schematic illustration of the timing of an uplink signal reception by a victim base station, subject to inter-link interference from an offending downlink signal by an offending base station.

FIG. 10 is a schematic illustration of an inter-link interference example between base stations according to some aspects of the disclosure. Inter-link interference may also occur at a base station, wherein the base station's reception of an UL transmission may be subject to inter-link interference from a DL transmission from a neighboring base station.

Referring to FIG. 10, while a victim base station 1002 is receiving an UL transmission 1004, it may be subject to inter-link interference from an offending DL signal 1006 by an offending base station 1008. In this case, the DL signal 1006 is considered to be an interfering signal from the point of view of the victim base station 1002. As indicated above, in some examples, slot boundaries may be aligned or synchronized between different base stations. Furthermore, as described above, a base station may manage TA values for UEs associated with the base station. In this manner, UL transmissions from different UEs may arrive at the base station having slot boundaries that are aligned with (or have a given offset from, according to a guard period) the base station's slot boundaries. In some examples, as illustrated in FIG. 10, the DL interference (i.e., DL signal 1006) by an offending base station 1008 may arrive at the base station 1002 later than the UL reception time of the UL transmission 1004 at the victim base station 1002.

In some aspects of the disclosure, the mechanisms used to communicate the propagation delay or timing advance (TA) may be different for UL and DL. For example, because the location of base stations can in many examples be fixed, the propagation delay (T_prop) between the two base stations may in some examples be pre-computed or determined based on the deployment. This is different from the UL example described in relation to FIG. 8 in which the UEs can use sidelink communication to signal TA. Although the precise value of the propagation delay T_prop may vary subject to multipath delay conditions, the multipath delays may be relatively small. Therefore, in some examples the multipath delay may be ignored with respect to interference cancellation implementation.

Figure 11:
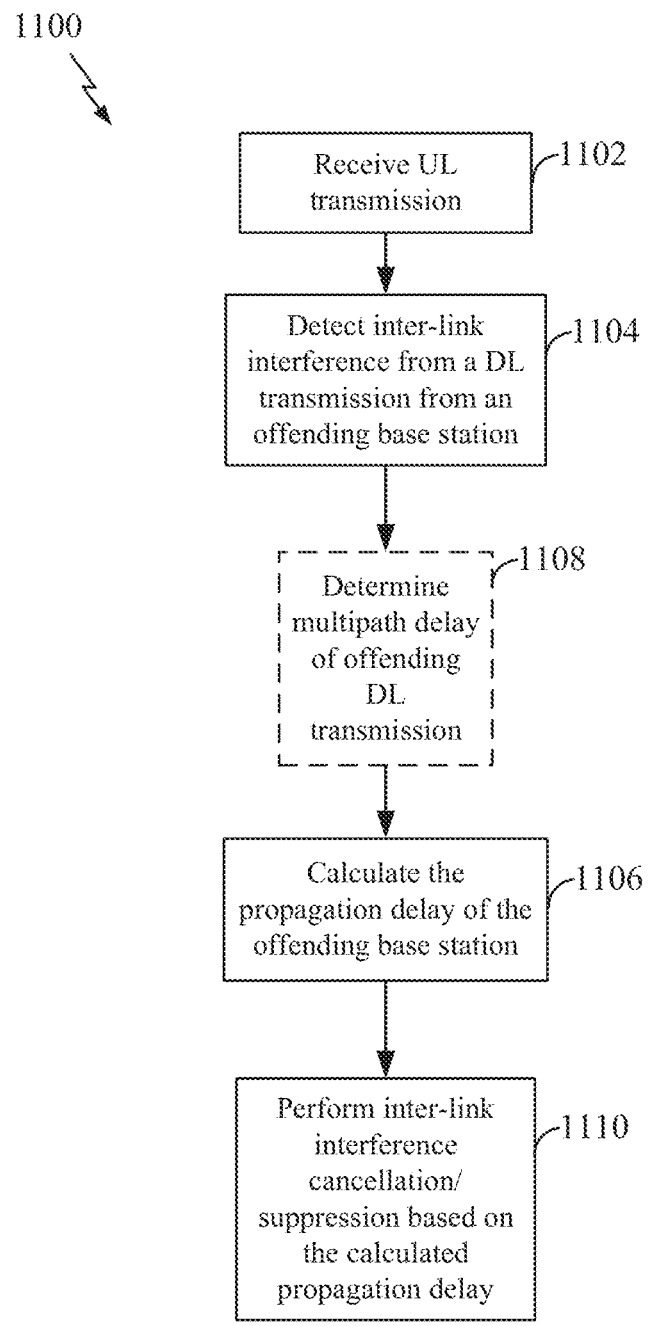
FIG. 11 is a flow chart illustrating a process for inter-link interference cancellation at a victim base station according to some aspects of the present disclosure.

FIG. 11 is a flow chart illustrating a process 1100 for inter-link interference cancellation at a base station according to some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduling entity 300 illustrated in FIG. 3. In some examples, the process 1100 may be carried out by any suitable apparatus or means for carrying out the functions or algorithm described below.

Referring to FIG. 11, at block 1102, a base station receives an UL transmission. For example, the base station may be the victim base station 1002 illustrated in FIG. 10. At block 1104, when the base station is receiving an UL transmission, the base station may detect or become aware of inter-link interference from an offending base station that transmits a DL transmission. For example, the offending base station may be the offending base station 1008 illustrated in FIG. 10. At block 1106, to facilitate inter-link interference cancellation, the victim base station may determine the propagation delay of the offending base station. Optionally, at block 1108, the victim base station may determine and consider multipath delay of the offending DL transmission in determining the propagation delay. Accordingly, at block 1110, the victim base station may perform inter-link interference cancellation or suppression based on the calculated propagation delay.

Figure 12:
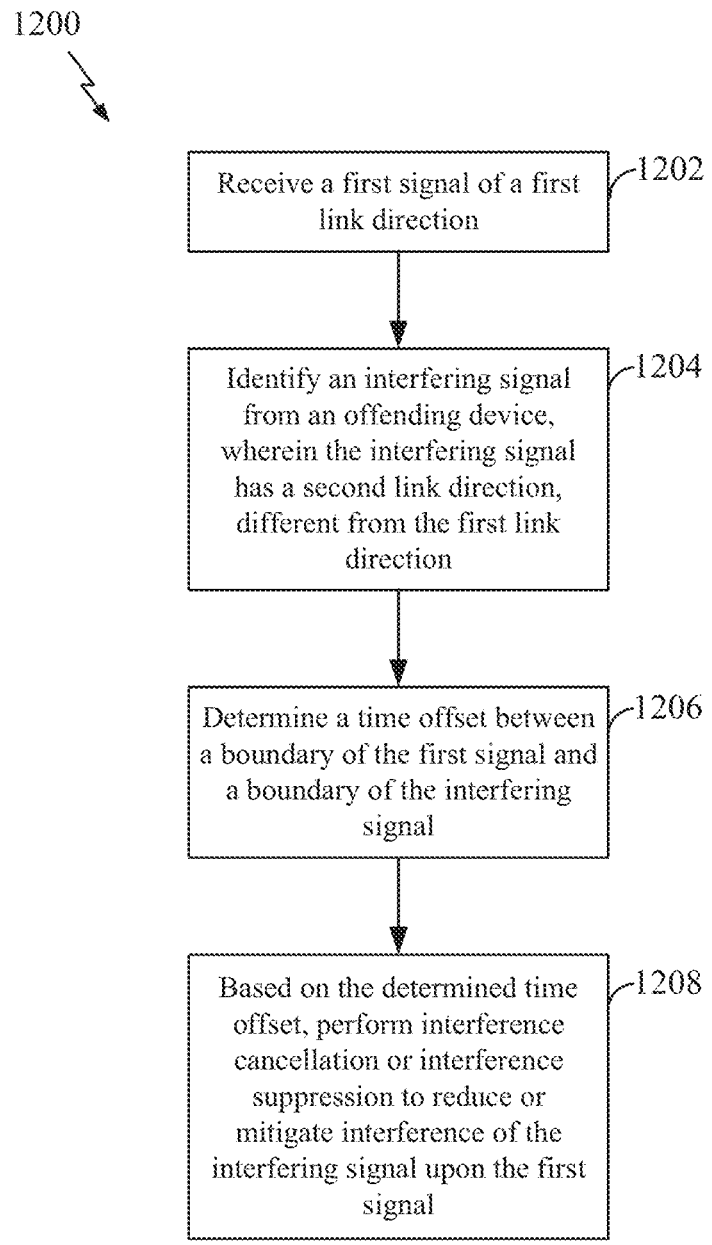
FIG. 12 is a flow chart illustrating a method for inter-link interference cancellation according to some aspects of the present disclosure.

FIG. 12 is a flow chart illustrating a method 1200 for inter-link interference cancellation according to some aspects of the present disclosure. As described below, some or all illustrated features may be omitted in a particular implementation within the scope of the present disclosure, and some illustrated features may not be required for implementation of all embodiments. In some examples, the method 1200 may be carried out by the scheduling entity 300 illustrated in FIG. 3 or the scheduled entity 400 illustrated in FIG. 4. In some examples, the method 1200 may be carried out by any suitable apparatus or means for carrying out the functions or algorithm described below.

At block 1202, an apparatus receives a first signal of a first link direction. In some examples, the apparatus may be a base station or a UE. The apparatus may utilize an interference cancelling communication interface (e.g., transceiver 310 or 410 of FIG. 3 or 4) to receive the first signal. The first signal may be a DL signal 706 (FIG. 7) or an UL signal 1004 (FIG. 10).

At block 1204, the apparatus identifies or detect an interfering signal from an offending device. The interfering signal has a second link direction that is different from the first link direction. The apparatus may utilize interference cancellation circuit and/or software to detect and/or identify the interfering signal. In some examples, the interference cancellation circuit may be the IC circuitry 340 or 440 and/or IC instructions 352 or 452 that are described in relation to FIG. 3 or 4. When the first signal is an UL, the interfering signal may be a DL, and vice versa.

At block 1206, the apparatus determines a time offset between a slot boundary of the first signal and a slot boundary of the interfering signal. The apparatus may utilize an offset compensation circuit to determine the time offset. In some examples, the offset compensation circuit may be the TOC circuitry 342 or 442 and/or TOC instructions 354 or 454 that are described in relation to the FIG. 3 or 4. In some examples, the time offset may be based on the lead time and/or propagation delay of the offending device as described above in relation to FIGS. 7-11.

At block 1208, based on the determined time offset, the apparatus performs interference cancellation or interference suppression to reduce or mitigate interference of the interfering signal upon the first signal. In one example, if the apparatus determines that the time offset is less than a cyclic prefix (CP) duration (e.g., 4.7 µs or less), the apparatus may perform interference cancellation or interference suppression. In another example, the offending device may transmit an indication or signaling to indicate that the timing offset is substantially small, for example, less than one CP duration. In still another example, the apparatus may assume that the timing offset is substantially small. The apparatus may utilize interference cancellation circuit and/or software to perform interference cancellation or interference suppression. In some examples, the interference cancellation circuit may be the IC circuitry 340 or 440 and/or IC instructions 352 or 452 that are described in relation to FIG. 3 or 4.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for inter-link interference cancellation, operable at a victim device, the method comprising:
   receiving a first signal of a first link direction in a plurality of slots;
   identifying an interfering signal from an offending device, wherein the interfering signal has a second link direction, different from the first link direction;
   receiving a sidelink signal from the offending device, comprising information indicating a timing advance for the offending device;
   determining a time offset between a boundary of the first signal and a boundary of the interfering signal, based on the timing advance for the offending device; and
   based on the determined time offset, performing interference cancellation or interference suppression during only a subset of the plurality of slots to reduce or mitigate interference of the interfering signal upon the first signal due to the time offset between the first signal and the interfering signal,
   wherein the interference cancellation or interference suppression comprises at least one of antenna isolation, transmit signal reconstruction and cancellation, or power amplifier noise cancellation.

2. The method of claim 1, wherein:
   the first link direction is an uplink and the second link direction is a downlink; or
   the first link direction is a downlink and the second link direction is an uplink.

3. The method of claim 1, further comprising:
   approximating a timing advance for the offending device as equal to a timing advance for the victim device,
   wherein the determined time offset is based on the approximated timing advance for the offending device.

4. The method of claim 1, wherein the sidelink signal further comprises information indicating a propagation delay for a transmission between the offending device and the victim device,
   wherein the determined time offset is further based on the propagation delay.

5. The method of claim 1,
   wherein the sidelink signal further comprises information indicating a serving cell ID of a serving cell for the offending device,
   wherein the determined time offset is further based on the serving cell ID of the offending device.

6. The method of claim 5, further comprising determining, based on the serving cell ID of the offending device, if the offending device and the victim device share a same serving cell;
   if the offending device and the victim device share the same serving cell, approximating a timing advance for the offending device as equal to a timing advance for the victim device, wherein the determined time offset is further based on the approximated timing advance for the offending device; and
   if the offending device and the victim device do not share the same serving cell, receiving a sidelink signal from the offending device, comprising information indicating a timing advance for the offending device, wherein the determined time offset is further based on the timing advance for the offending device.

7. The method of claim 1, wherein the offending device and the victim device operate under a time division duplex (TDD) wireless communication system, and wherein the determined time offset is based at least in part on a fixed timing offset value.

8. The method of claim 7, wherein the fixed timing offset value is based at least in part on a time utilized for switching from transmission to reception, or a time utilized for switching from reception to transmission.

9. The method of claim 1, wherein the offending device and the victim device are user equipment (UEs).

10. The method of claim 1, wherein the offending device and the victim device are base stations,
wherein the determined time offset comprises a lead time between the first signal and the interfering signal, and wherein the lead time is based at least in part on a predetermined distance between the offending device and the victim device.

11. The method of claim 1, wherein the determining the time offset between the boundary of the first signal and the boundary of the interfering signal comprises:
determining that the time offset is less than a cyclic prefix duration.

12. The method of claim 11, wherein the determination is based on an indication from the offending device.

13. A wireless communication device comprising:
a memory stored with executable code;
a transceiver configured for wireless communication; and
a processor operatively coupled to the memory and transceiver,
wherein the processor is configured by the executable code to:
receive, as a victim device, a first signal of a first link direction, in a plurality of slots;
identify an interfering signal from an offending device, wherein the interfering signal has a second link direction, different from the first link direction;
receive a sidelink signal from the offending device, comprising information indicating a timing advance for the offending device;
determine a time offset between a boundary of the first signal and a boundary of the interfering signal, based on the timing advance for the offending device; and
based on the determined time offset, perform interference cancellation or interference suppression during only a subset of the plurality of slots to reduce or mitigate interference of the interfering signal upon the first signal due to the time offset between the first signal and the interfering signal,
wherein the interference cancellation or interference suppression comprises at least one of antenna isolation, transmit signal reconstruction and cancellation, or power amplifier noise cancellation.

14. The wireless communication device of claim 13, wherein the processor is further configured to:
approximate a timing advance for the offending device as equal to a timing advance for the victim device,
wherein the determined time offset is based on the approximated timing advance for the offending device.

15. The wireless communication device of claim 13,
wherein the sidelink signal further comprises information indicating a serving cell ID of a serving cell for the offending device,
wherein the determined time offset is further based on the serving cell ID of the offending device.

16. The wireless communication device of claim 15, wherein the processor is further configured to:
determine, based on the serving cell ID of the offending device, if the offending device and the victim device share a same serving cell;
if the offending device and the victim device share the same serving cell, approximate a timing advance for the offending device as equal to a timing advance for the victim device, wherein the determined time offset is further based on the approximated timing advance for the offending device; and
if the offending device and the victim device do not share the same serving cell, receive a sidelink signal from the offending device, comprising information indicating a timing advance for the offending device, wherein the determined time offset is further based on the timing advance for the offending device.

17. The wireless communication device of claim 16, wherein the processor is further configured to:
determine that the time offset is less than a cyclic prefix duration.

18. A wireless communication device comprising:
means for receiving, as a victim device, a first signal of a first link direction in a plurality of slots;
means for identifying an interfering signal from an offending device, wherein the interfering signal has a second link direction, different from the first link direction;
means for receiving a sidelink signal from the offending device, comprising information indicating a timing advance for the offending device;
means for determining a time offset between a boundary of the first signal and a boundary of the interfering signal, based on the timing advance for the offending device; and
means for based on the determined time offset, performing interference cancellation or interference suppression during only a subset of the plurality of slots to reduce or mitigate interference of the interfering signal upon the first signal due to the time offset between the first signal and the interfering signal,
wherein the interference cancellation or interference suppression comprises at least one of antenna isolation, transmit signal reconstruction and cancellation, or power amplifier noise cancellation.

* * * * *